United States Patent
Petainen

(10) Patent No.: US 10,705,788 B2
(45) Date of Patent: Jul. 7, 2020

(54) METHOD AND APPARATUS FOR CONTROLLING AUDIO OUTPUT

(71) Applicant: Nokia Technologies Oy, Espoo (FI)

(72) Inventor: Henna Katriina Petainen, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 174 days.

(21) Appl. No.: 14/902,666

(22) PCT Filed: Jul. 9, 2013

(86) PCT No.: PCT/FI2013/050740
§ 371 (c)(1),
(2) Date: Jan. 4, 2016

(87) PCT Pub. No.: WO2015/004307
PCT Pub. Date: Jan. 15, 2015

(65) Prior Publication Data
US 2016/0170707 A1    Jun. 16, 2016

(51) Int. Cl.
*G06F 3/048* (2013.01)
*G06F 3/16* (2006.01)
(Continued)

(52) U.S. Cl.
CPC ............ *G06F 3/165* (2013.01); *G06F 3/0485* (2013.01); *H04R 3/12* (2013.01); *H04R 2430/01* (2013.01); *H04R 2499/15* (2013.01)

(58) Field of Classification Search
CPC ... G06F 3/0485; G06F 3/165; H04R 2430/01; H04M 1/605
See application file for complete search history.

(56) References Cited

U.S. PATENT DOCUMENTS

| 9,742,849 | B2* | 8/2017 | Trott | H04L 67/14 |
| 2006/0236255 | A1* | 10/2006 | Lindsay | G06F 3/0481 |
| | | | | 715/766 |

(Continued)

OTHER PUBLICATIONS

International Search Report and Written Opinion received for corresponding Patent Cooperation Treaty Application No. PCT/FI2013/050740, dated Mar. 25, 2014, 11 pages.

*Primary Examiner* — Pei Yong Weng
(74) *Attorney, Agent, or Firm* — Mintz Levin Cohn Ferris Glovsky and Popeo, P.C.

(57) ABSTRACT

A method, apparatus and computer program product are provided to enhance the experience of a user of a computing device, such as a computing device having a plurality of speakers. In the context of a method, content is caused to be presented upon the display. The content is associated with a representation of an audio source. The method also includes determining a location of the representation of the audio source relative to the display. The method further includes preferentially directing audio signals generated by the audio source to one or more of a plurality of speakers that have different respective positions relative to the display. In this regard, the method may preferentially direct the audio signals by preferentially directing audio signals based upon the location of the representation of the audio source relative to the display and also based upon the respective positions of the speakers relative to the display.

16 Claims, 7 Drawing Sheets

(51) Int. Cl.
*G06F 3/0485* (2013.01)
*H04R 3/12* (2006.01)

(56) References Cited

U.S. PATENT DOCUMENTS

2011/0116665 A1* 5/2011 King ................. G06F 3/165
                                                    381/300
2011/0153043 A1* 6/2011 Ojala .................. G06F 3/0488
                                                    700/94
2014/0085210 A1* 3/2014 Avrahami ............. H04S 7/303
                                                    345/173

* cited by examiner

METHOD AND APPARATUS FOR CONTROLLING AUDIO OUTPUT

RELATED APPLICATION

This application was originally filed as Patent Cooperation Treaty Application No. PCT/FI2013/050740 filed Jul. 9, 2013.

TECHNOLOGICAL FIELD

An example embodiment of the present invention relates generally to the generation of audio output and, more particularly, to the control of the manner in which audio signals are output.

BACKGROUND

Computing devices, such as tablet computers, laptop computers, personal digital assistants (PDAs), mobile telephones and the like, are configured to output audio from a wide variety of audio sources including, for example, media players and music store applications. For example, computing devices may regularly be utilized to view web pages or other content accessed over the internet. This content may include video clips or other audio files embedded therewithin.

The video clip or other audio file may be embedded at various locations within the content that is viewed via the computing device. For example, the representation of the video clip or other audio file may be centrally positioned within the content, along the left-hand border of the content, along the right-hand border of the content, or elsewhere therein. By selecting the video clip or other audio file, the video clip or other audio file may be played with the audio signals generated thereby being output via the speakers of the computing device. Computing devices also generally permit a wide variety of other types of audio files to be played so as to generate audio signals that are output via the speakers of the computing device.

By permitting video clips and other types of audio sources to be included with content that is presented upon the display of a computing device, the experience of the user is enhanced and the utility of the computing device, including the functions performed by the computing device, is improved. Indeed, users not only can review content that is visually presented, such as text, images or the like, but can also listen to audio output that may be related to the visual content so as to enhance the user experience.

BRIEF SUMMARY

A method, apparatus and computer program product are provided in accordance with an example embodiment of the present invention in order to further enhance the experience of a user of a computing device, such as a computing device having a plurality of speakers. In this regard, the method, apparatus and computer program product of an example embodiment may preferentially direct audio signal to one or more of the speakers based upon the location of the representation of the audio source within the content that is presented upon a display relative to the display itself and also based upon the location of the speakers relative to the display. For example, audio signals may be preferentially output, such as by being output with a greater volume, from the speakers that are physically closer to the representation of the audio source within the content that is presented upon the display than from the speakers that are further removed from the representation of the audio source. As such, the method, apparatus and computer program product of an example embodiment may cause the audio signals to be output in a manner that provides additional context to the user and that further enhances the user experience.

In one embodiment, a method is provided that includes causing content to be presented upon the display. The content is associated with a representation of an audio source. For example, the audio source may be a media player, a music store application, an advertisement, a media clip or the like. Additionally or alternatively, the audio source may include a user-selectable tab associated with the content. The method also includes determining a location of the representation of the audio source relative to the display. The method further includes preferentially directing audio signals generated by the audio source to one or more of a plurality of speakers that have different respective positions relative to the display. In this regard, the method may preferentially direct the audio signals by preferentially directing audio signals based upon the location of the representation of the audio source relative to the display and also based upon the respective positions of the speakers relative to the display.

The method of one embodiment may preferentially direct the audio signals by causing the audio signals to be output with a greater volume by the one or more speakers that are closest to the representation of the audio source on the display. In this regard, the method may cause the audio signals to be output with a greater volume by causing the audio signals to only be output by a subset of the plurality of speakers such that one or more speakers that are further from the representation of the audio source on the display are not caused to output the audio signals. The method of this embodiment may also or alternatively cause the audio signals to be output with a greater volume by causing the audio signals to be output by a plurality of speakers and causing the audio signals output by the plurality of speakers to have different volumes based upon the location of the representation of the audio source relative to the display and also based upon the respective positions of the plurality of speakers relative to the display. In one embodiment, the content may include a plurality of audio sources and, as such, the method may preferentially direct the audio signals by causing the audio signals from no more than a predetermined maximum number of audio sources to be concurrently output.

The method of an example embodiment may also include causing the content to be scrolled upon the display such that the location of the representation of the audio source relative to the display changes. In this embodiment, the method may preferentially direct the audio signals by modifying a preferential direction of the audio signals as the location of the representation of the audio source relative to the display changes in response to the scrolling of the content. In one embodiment, the representation of the audio source is not presented upon the display. However, the method may preferentially direct the audio signals by causing the audio signals to be output with a volume that depends upon the distance that the content must be scrolled to cause the representation of the audio source to be presented upon the display and also upon the direction in which the representation of the audio source is being scrolled relative to the display. In this embodiment, the method may cause the audio signals to be output with a volume by causing the audio signals to be output with a volume that is inversely proportional to the distance that the content must be scrolled to cause the representation of the audio source to be presented upon the display.

In another embodiment, an apparatus is provided that includes a processor and a memory including computer program code with the memory and the computer program code configured to, with the processor, cause the apparatus to cause content to be presented upon a display. The content is associated with a representation of an audio source. For example, the audio source may include a media player, a music store application, an advertisement, a media clip or the like. Additionally or alternatively, the representation of the audio source may include a user-selectable tab associated with the content. The memory and the computer program code are further configured to, with the processor, cause the apparatus to determine a location of the representation of the audio source relative to the display and to preferentially direct audio signals generated by the audio source to one or more of a plurality of speakers that have different respective positions relative to the display. In this regard, the memory and the computer program code may be configured to, with the processor, cause the apparatus to preferentially direct the audio signals by preferentially directing the audio signals based upon the location of the representation of the audio source relative to the display and the respective positions of the speakers relative to the display.

The memory and the computer program code may be configured to, with the processor, cause the apparatus of one embodiment to preferentially direct audio signals by causing the audio signals to be output with greater volume by the one or more speakers that are closest to the representation of the audio source on the display. In this embodiment, the memory and the computer program code may be configured to, with the processor, cause the apparatus to cause the audio signals to be output with greater volume by causing the audio signals to only be output by a subset of the plurality of speakers such that one or more speakers that are further from the representation of the audio source on the display are not caused to output the audio signal.

Additionally or alternatively, the memory and the computer program code may be configured to, with the processor, cause the apparatus of this embodiment to cause the audio signals to be output with greater volume by causing the audio signals to be output by a plurality of speakers and by causing the audio signals output by the plurality of speakers to have different volumes based upon the location of the representation of the audio source relative to the display and based upon the respective positions of the plurality of speakers relative to the display. In one embodiment, the content may include a plurality of audio sources. As such, the memory and the computer program code may be configured to, with the processor, cause the apparatus of this embodiment to preferentially direct audio signals by causing audio signals from no more than a predetermined maximum number of audio sources to be concurrently output.

The memory and the computer program code are further configured to, with the processor, cause the apparatus of one embodiment to cause the content to be scrolled upon a display such that the location of the representation of the audio source relative to the display changes. In this embodiment, the memory and the computer program code may be configured to, with the processor, cause the apparatus to preferentially direct audio signals by modifying a preferential direction of the audio signals as the location of the representation of the audio source relative to the display changes in response to scrolling of the content. In one embodiment, the representation of the audio source is not presented upon the display. As such, the memory and the computer program code may be further configured to, with the processor, cause the apparatus to preferentially direct audio signals by causing the audio signals to be output with a volume that depends upon a distance that the content must be scrolled to cause the representation of the audio source to be presented upon the display as well as a direction in which the representation of the audio source is being scrolled relative to the display. In this embodiment, the memory and the computer program code may also be configured to, with the processor, cause the apparatus to cause the audio signals to be output with a volume by causing the audio signals to be output with a volume that is inversely proportional to the distance that the content must be scrolled to cause the representation of the audio source to be presented upon the display.

In a further embodiment, a computer program product is provided that includes a non-transitory computer-readable medium having program code portions stored therein with the program code portion configured, upon execution, to cause content to be presented upon a display. The content is associated with a representation of an audio source. The program code portions are also configured to determine a location of the representation of the audio source relative to the display. Further, the program code portions are configured to preferentially direct audio signals generated by the audio source to one or more of a plurality of speakers that have different respective positions relative to the display. The program code portions that are configured to preferentially direct the audio signals may include program code portions configured to preferentially direct audio signals based upon the location of the representation of the audio source relative to the display and based upon the respective positions of the speakers relative to the display.

The program code portions configured to preferentially direct the audio signals may, in one embodiment, include program code portions configured to cause the audio signals to be output with greater volume by the one or more speakers that are closest to the representation of the audio source on the display. In this embodiment, the program code portions configured to cause the audio signals to be output with greater volume may include program code portions configured to cause the audio signals to only be output by a subset of the plurality of speakers such that one or more speakers that are further from the representation of the audio source on the display are not caused to output the audio signals. Additionally or alternatively, the program code portions that are configured to cause the audio signals to be output with greater volume may include program code portions configured to cause the audio signals to be output by a plurality of speakers and program code portions configured to cause the audio signals output by the plurality of speakers to have different volumes based upon the location of the representation of the audio source relative to the display and based upon the respective positions of the plurality of speakers relative to the display.

The program code portions of one embodiment may be further configured to cause the content to be scrolled upon the display such that the location of the representation of the audio source relative to the display changes. In this embodiment, the program code portions may be configured to modify a preferential direction of the audio signals as the location of the representation of the audio source relative to the display changes in response to the scrolling of the content. In one embodiment, the representation of the audio source is not presented upon the display. As such, the program code portions configured to preferentially direct the audio signals may, in this embodiment, include program code portions configured to cause the audio signals to be output with a volume that depends upon a distance that the content must be scrolled to cause the representation of the audio source to be presented upon the display as well as a direction in which the representation of the audio source is being scrolled relative to the display.

In yet another embodiment, an apparatus is provided that includes means for causing content to be presented upon the display. The content is associated with a representation of an audio source. The apparatus also includes means for determining a location of the representation of the audio source relative to the display and a means for preferentially directing audio signals generated by the audio source to one or more of a plurality of speakers that have different respective positions relative to the display. The means for preferentially directing audio signals may include means for preferentially directing audio signals based upon the location of the representation of the audio source relative to the display and based upon the respective positions of the speakers relative to the display.

The means for preferentially directing audio signals may include, in one embodiment, means for causing the audio signals to be output with greater volume by one or more speakers that are closest to the representation of the audio source on the display. In this embodiment, the means for causing the audio signals to be output with greater volume may include means for causing the audio signals to only be output by a subset of a plurality of speakers such that one or more speakers that are further from the representation of the audio source on the display are not caused to output the audio signals. Additionally or alternatively, the means for causing the audio signals to be output with greater volume may include means for causing the audio signals to be output by a plurality of speakers and means for causing the audio signals output by the plurality of speakers to have different volumes depending upon the location of the representation of the audio source relative to the display and based upon the respective positions of the plurality of speakers relative to the display.

An apparatus of an example embodiment may also include means for causing the content to be scrolled upon the display such that that the location of the representation of the audio source relative to the display changes. In this regard, the means for preferentially directing the audio signals may include means for modifying a preferential direction of the audio signals as the location of the representation of the audio source relative to the display changes in response to scrolling of the content. In one embodiment, the representation of the audio source is not presented upon the display. The means for preferentially directing audio signals in accordance with this embodiment may also include means for causing the audio signals to be output with a volume that depends upon a distance that the content must be scrolled to cause the representation of the audio source to be presented upon the display as well as a direction in which the representation of the audio source is being scrolled relative to the display.

BRIEF DESCRIPTION OF THE DRAWINGS

Figure 1:
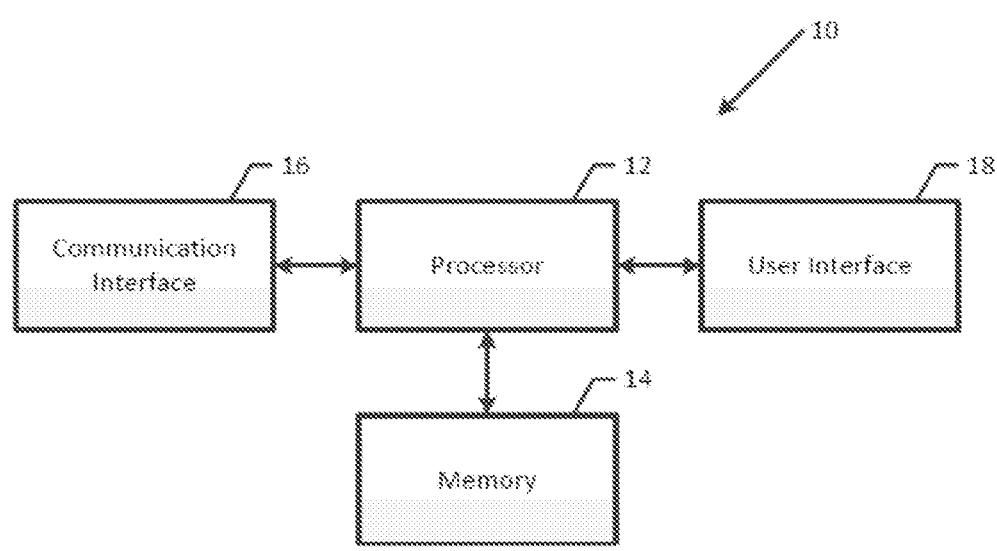
Figure 2:
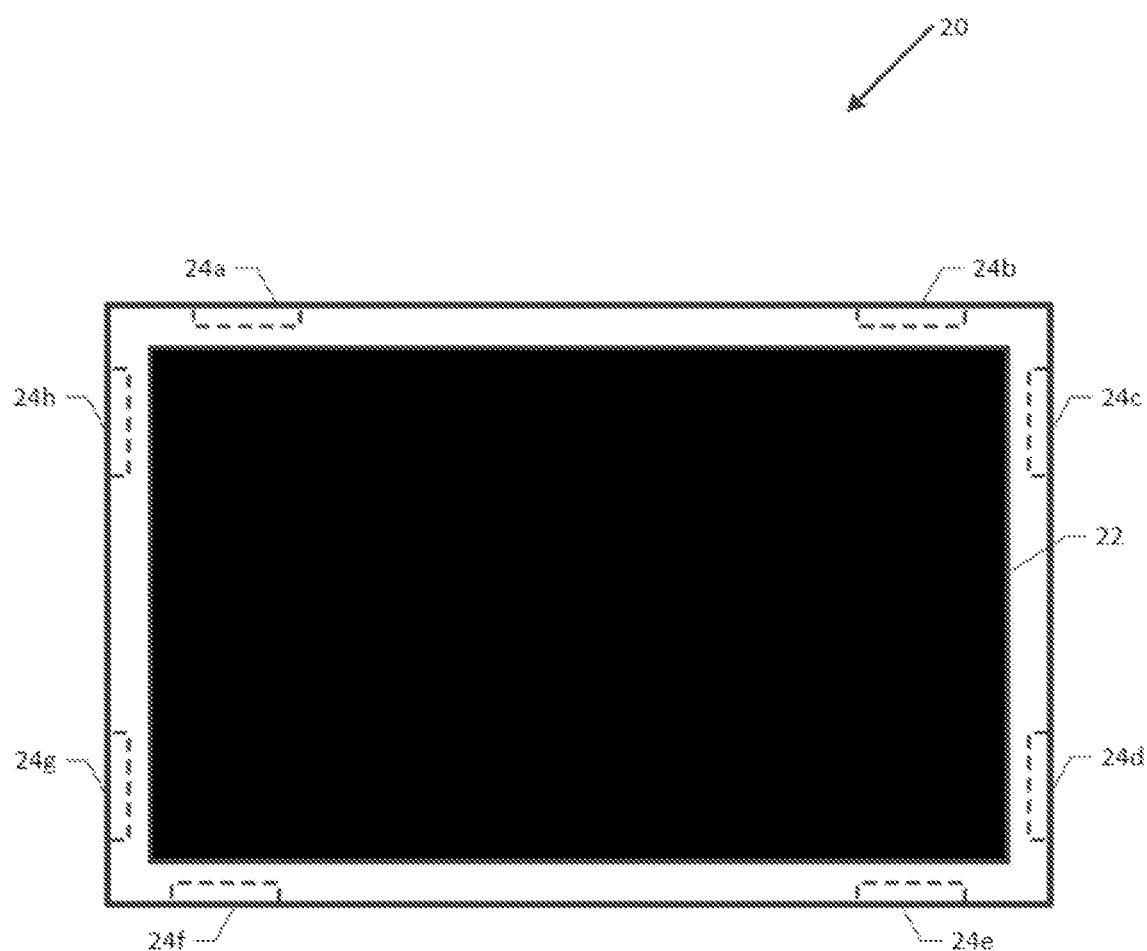
Figure 3:
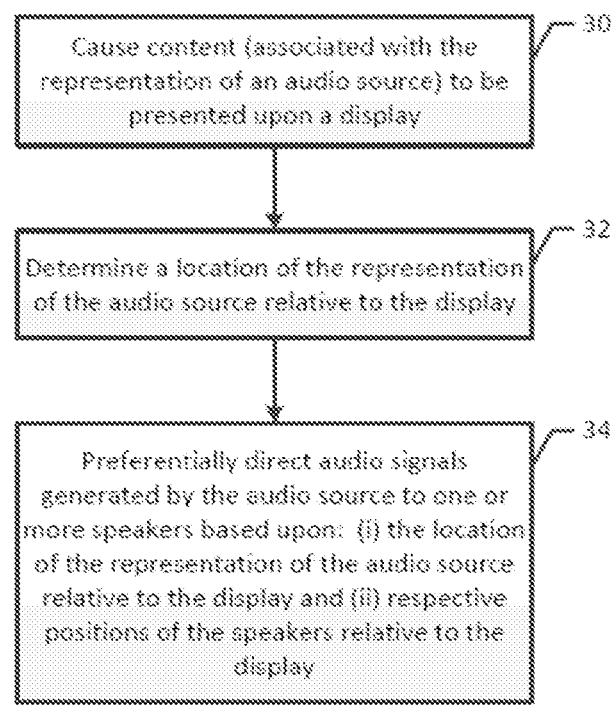
Figure 4:
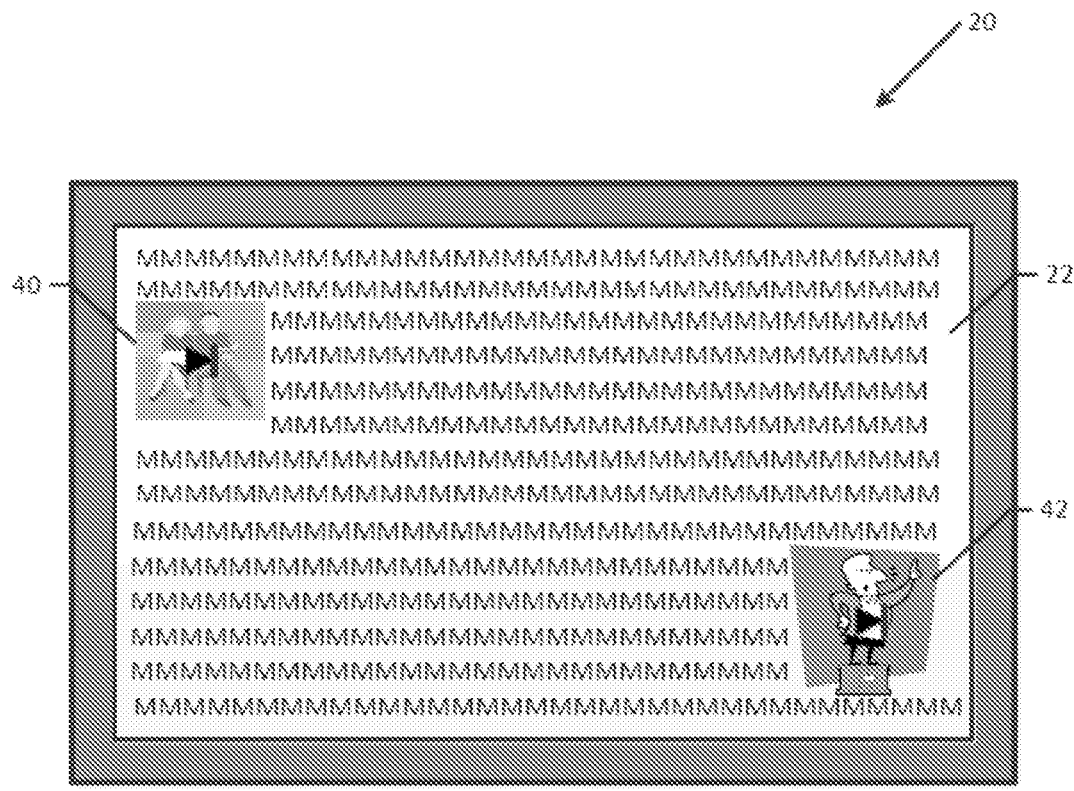
Figure 5:
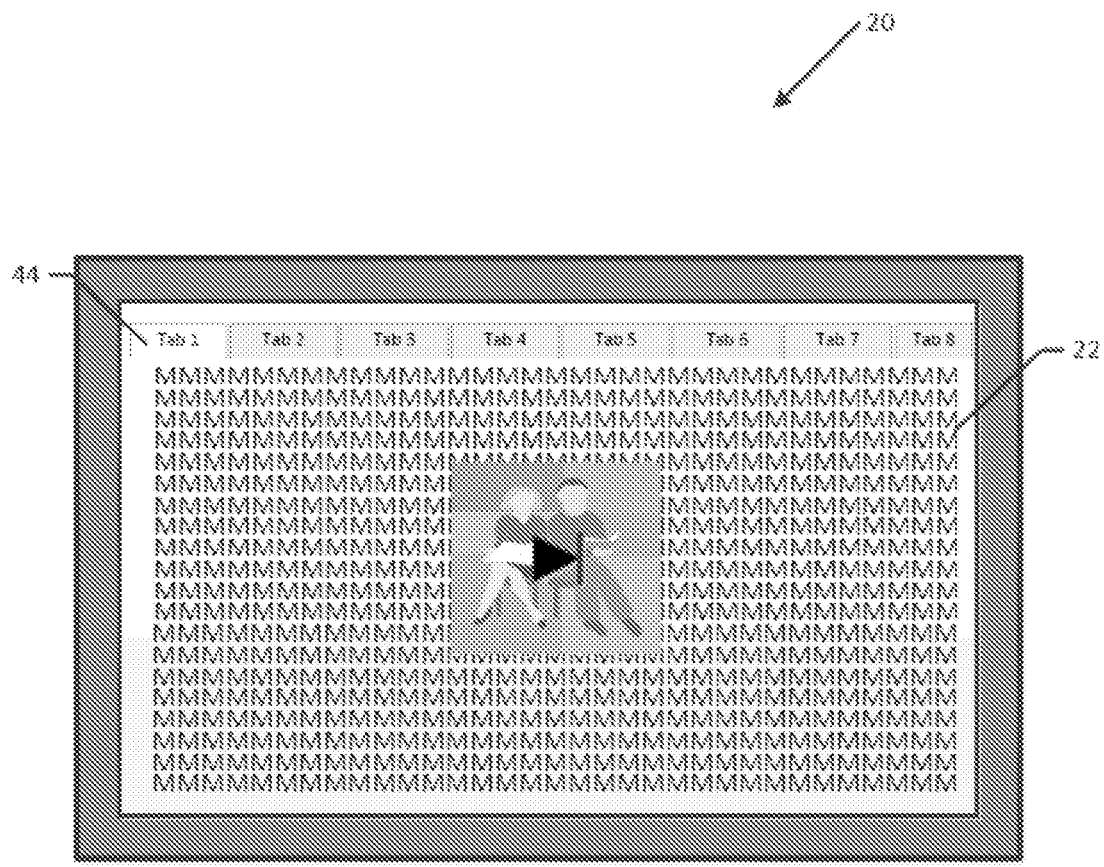
Figure 6:
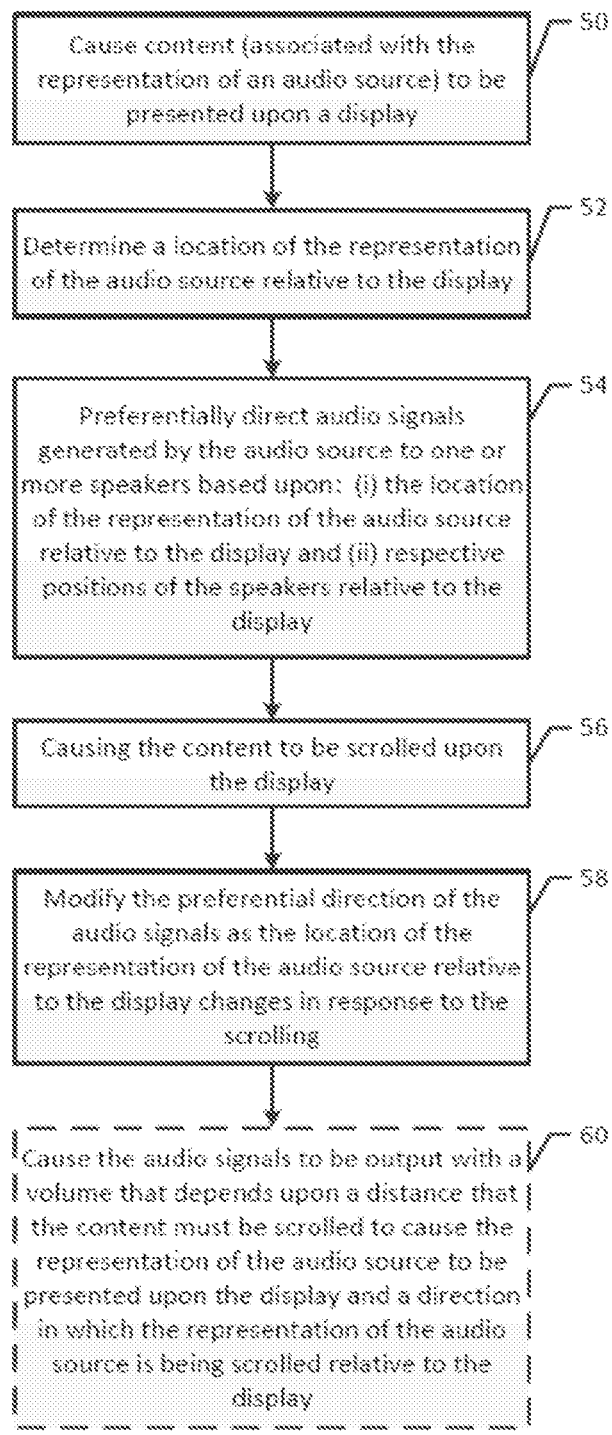
Figure 7:
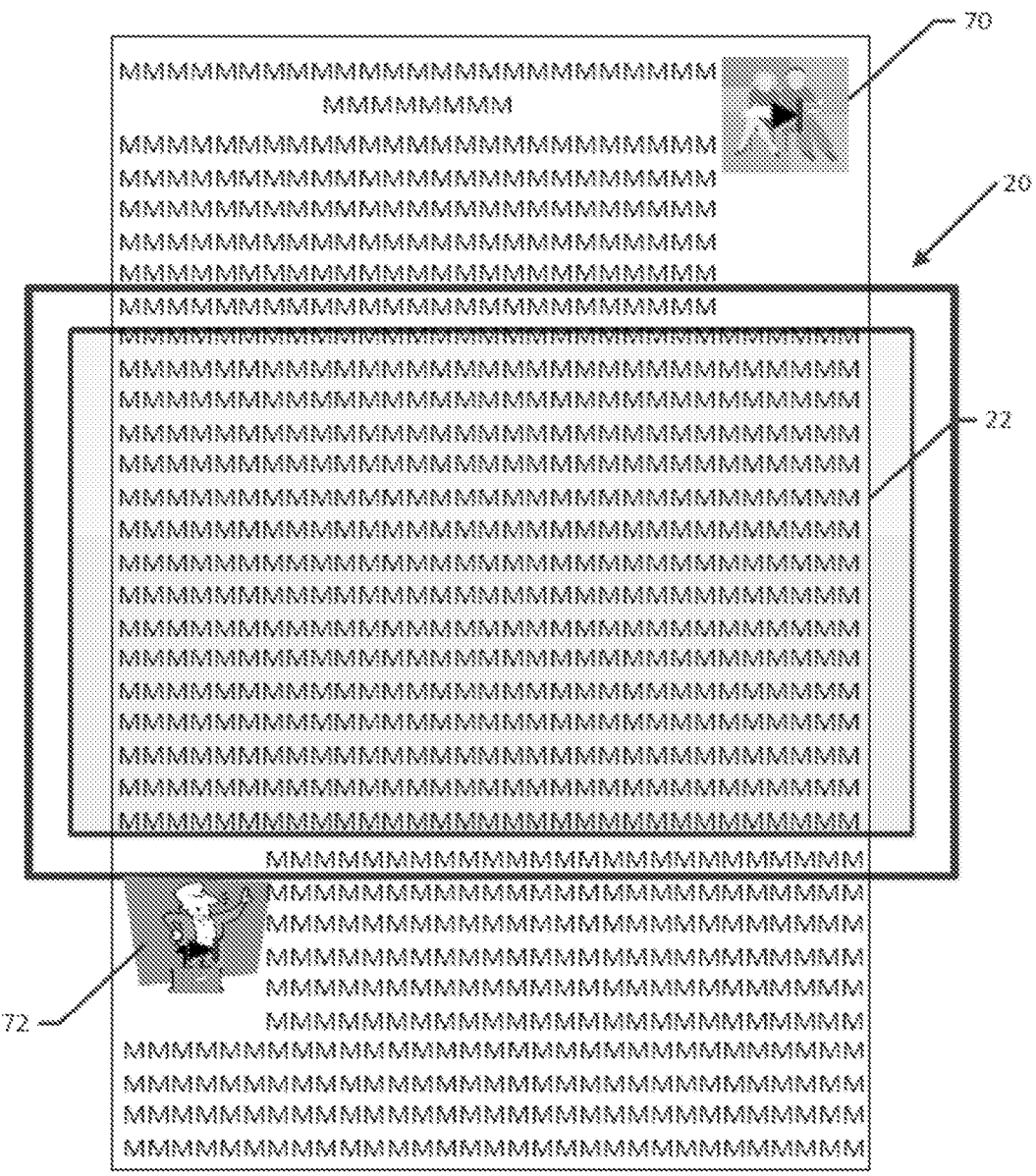

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 illustrates a computing device, such as a tablet computer, that may embody or otherwise be associated with the apparatus of FIG. 1 and that may also be specifically configured in accordance with an example embodiment of the present invention;

FIG. 3 is a flowchart of operations that may be performed, such as by the apparatus of FIG. 1, in accordance with an example embodiment of the present invention;

FIG. 4 illustrates an example of content that may be presented upon a display that includes representations of two different audio sources;

FIG. 5 illustrates content that includes a representation of an audio source that may be presented upon a display in response to user selection of a tab;

FIG. 6 is a flowchart illustrating operations performed, such as by the apparatus of FIG. 1, in accordance with another example embodiment of the present invention; and FIG. 7 illustrates content that includes representations of two audio sources and that may be scrolled relative to a display such that a portion of the content is presented upon a display.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to control the manner in which audio signals generated by one or more audio sources are output from one or more of the speakers of a computing device. In this regard, the method, apparatus and computer program product of an example embodiment may preferentially direct the audio signals generated by an audio source to one or more of a plurality of speakers based upon the location of the representation of the audio source relative to the display and also based upon the respective positions of the speakers relative to the display. By way of example, the audio signals generated by an audio source that is positioned within content that is displayed upon the display along the left-hand side of the display may be preferentially output by the speakers proximate the left-hand side of the display, while the audio signals generated by an audio source having a representation within the content presented upon the display along the right-hand side of the display may be preferentially output by the speakers proximate the right-hand side of the display of the computing device. Thus, the manner in which the audio signals are output by the computing device may provide additional context to the user and may enhance the user experience.

The method, apparatus and computer program product may be embodied by or otherwise associated with a wide variety of computing devices. For example, the method, apparatus and computer program product of an example embodiment may be embodied by or otherwise associated with various mobile computing devices including, for example, a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. Alternatively, the method, apparatus and computer program product of an example embodiment may be embodied by or otherwise associated with a fixed or other non-mobile computing device, such as a desktop computer, a personal computer, a workstation or the like.

Regardless of the type of computing device, the computing device may include or otherwise be associated with an apparatus 10, such as that shown in FIG. 1, that is specifically configured in accordance with an example embodiment of the present invention to control the audio output. The apparatus may include or otherwise be in communication with a processor 12, a memory device 14, an optional communication interface 16 and a user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories.

In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device, such as a tablet computer. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Although the apparatus 10 and, as such, the computing device that embodies or is otherwise associated with the apparatus may be configured to operate on an independent and standalone basis without communication with other computing devices and/or a communications network, the apparatus of an example embodiment may also include a communication interface 26 that may be any means such as a device or circuitry embodied in either hardware or a combination of hardware and software that is configured to receive and/or transmit data from/to a communications device in communication with the apparatus 10, such as to facilitate communications therebetween. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 10 also generally includes a user interface 18 that may, in turn, be in communication with the processor 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like.

The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

As noted above, the apparatus 10 may be embodied by or associated with a wide variety of computing devices. For purposes of example, but not of limitation, the apparatus will be hereinafter described to be embodied by a tablet computer 20, such as shown in FIG. 2. Among other components, the tablet computer includes a display 22 upon which content may be presented and a plurality of speakers. The plurality of speakers may be located at different positions relative to the display. By way of an example, the tablet computer of the embodiment of FIG. 2 includes eight speakers including first and second speakers 24a and 24b positioned along the upper edge of the tablet computer proximate the left and right sides, respectively, of the tablet computer, third and fourth speakers 24c and 24d along the right side of the tablet computer proximate the upper and lower edges, respectively, of the tablet computer, fifth and sixth speakers 24e and 24f along the lower edge of the tablet computer proximate the right and left sides, respectively, of the tablet computer and seventh and eighth speakers 24g and 24h along the left side of the tablet computer proximate the lower and upper edges, respectively, of the tablet computer.

As described above, the apparatus 10 may include a user interface 18. In the embodiment in which the apparatus is embodied by or associated with a tablet computer 20 of the type depicted in FIG. 2, the user interface may include the display 22 and the plurality of speakers 24. As described below, the processor 12 may control the direction of audio signals to the speakers such that the speakers may be individually driven and may output different audio signals.

While the tablet computer 20 of FIG. 2 provides one example of a user interface 28 having a plurality of speakers 24, the plurality of speakers may be embodied in various other manners. For example, the speakers may be embodied by a pair of headphones having left and right speakers associated with the left and right ears of the user. In this embodiment, the left and right speakers of the headset may be associated with the left and right sides of the display 22 and audio signals may be controllably directed thereto depending upon the relative location of a representation of an audio source to the left and right sides of the display in the manner described below. As another example, instead of being integral with the display as in the example of FIG. 2, the speakers may be mobile relative to the display and may be coupled to the processor 12, such as by being coupled to the tablet computer, via a wireless or wired connection. For example, the speakers of this example embodiment may be coupled to the processor via Bluetooth or other wireless connection. The respective locations of the speakers to the display in accordance with this example embodiment may be defined by the user or may be defined by a multi-channel sound format, such as by Dolby surround sound format. As such, the processor may controllably direct the audio signals to the mobile speakers based upon their respective locations to the display as described below.

Referring now to FIG. 3, the operations performed, such as by the apparatus 10 of FIG. 1, in order to preferentially direct audio signals to the plurality of speakers 24 in accordance with an example embodiment are illustrated. As shown in block 30, the apparatus may include means, such as the processor 12, the user interface 18 or the like, for causing content to be presented upon the display 22. A wide variety of content may be presented upon the display including textual content, imagery and/or other types of content. Additionally, the content may be locally stored, such as by memory 14, or may be obtained, such as via communication interface 16, from one or more other computing devices and/or from a network device, such as a server. By way of example, the computing device may access content stored or otherwise provided by a server via the communication interface and may cause the content obtained therefrom to be presented upon the display. As such, web content, such as a web page, may be presented upon the display.

Regardless of the type of content and the origin of the content, the content may be associated with the representation of an audio source. The content may be associated with representations of a wide variety of audio sources including, for example, media clips, such as video clips, audio files or the like. Additionally or alternatively, the audio sources may include a media player, a music store application, advertisements, or the like. Regardless of the type of audio source, the audio source may be represented in various manners including by an icon embedded or otherwise included within the content, by an image or window embedded or otherwise included within the content or otherwise. As shown in FIG. 4, for example, content may be presented upon the display 22 of a computing device 20, such as a tablet computer, and may include the representation of an audio source, such as the representations of two different audio sources 40, 42 in the illustrated embodiment. In this example, the representations of the audio sources are windows embedded within the textual content, which is generically represented by the series of MMMMMMM. The representations of the audio sources may be selected or otherwise actuated by the user in order to cause the audio signals provided by the respective audio source to be output. By way of example, a web page may include one or more video clips embedded within textual content. While reviewing the textual content, the user may select or otherwise actuate a video clip in order to cause the video and associated audio to be output. In this example, the representation of the video clip may be a window that includes a still image from the video clip, such as the initial image of the video clip, along with an icon, such as a rightwardly facing arrow that may be selected or otherwise actuated by user in order to launch the video clip. Although the representation of an audio source may require actuation by a user in order to output the audio signals, the representation of an audio source may, instead, be automatically actuated so as to generate audio signals upon selection and/or viewing of the content in which the representation of the audio source is embedded.

By way of another example, the representation of the audio source may be a user-selectable tab associated with the content. As shown in FIG. 5, for example, a plurality of different files or applications may be concurrently open and executed by the apparatus 10 embodied by or otherwise associated with a computing device 20. Each of the concurrently executing files or applications may be represented by a corresponding tab that is presented upon the display, such as along the upper edge of the display of the example embodiment of FIG. 5. In this regard, the display of FIG. 5 depicts eight different tabs designated Tab 1-Tab 8 along the upper edge of the display, each of which may be associated with a different respective application that is concurrently executed. By selecting one of the tabs, the user of the computing device may instruct the computing device as to which of the applications to be presented in the foreground of the display with the remainder of the applications being concurrently operated in the background of the display and therefore not currently visible to the user. As shown in FIG. 5, the tab, e.g., Tab 1, that has been selected by the user may be designated, such as by highlighting, shading or the like and the content that is attributable to execution of the application associated with the selected tab may be presented upon the display. In this embodiment, the representation of the audio source may include the user-selectable tab that is associated with the content as well as any representation of the audio source that is embedded within or otherwise included within the content that is presented upon the display.

Returning to FIG. 3, the apparatus 10 also includes means, such as the processor 12 or the like, for determining the location of the representation of the audio source relative to the display 22. See block 32. For example, the processor may be configured to determine if the representation of the audio source is centrally located or is located along one or more of the edges of the display, such as along the upper edge, the right side of the display, the lower edge or the left side of the display. While the location of the representation of the audio source may be static and unvarying, the location of the representation of the audio source may be dynamic or otherwise vary, such as in response to user input and, as such, the processor may be configured to repeatedly determine the location of the representation of the audio source in order to detect instances in which the location of the representation of the audio source is changed.

As shown in block 34 of FIG. 3, the apparatus 10 may also include means, such as the processor 12, the user interface 18 or the like, for preferentially directing the audio signals generated by the audio source, such as in response to selection or other actuation of the audio source by the user, to one or more of a plurality of speakers 24 that have different respective positions relative to the display. In this regard, the processor may be configured to preferentially direct the audio signals based upon the location of the representation of the audio source relative to the display 22 and also based upon the respective positions of the speakers relative to the display. The processor may be configured to preferentially direct the audio signals to the speakers in different manners. For example, the processor may be configured to preferentially direct the audio signals so that the audio signals are only provided to one or more of the speakers and are not provided to other speakers such that the audio signals can only be output by the one or more speakers to which the audio signals are directed. Additionally or alternatively, the processor may preferentially direct the audio signals by controlling the volume with which the audio signals are output by the respective speakers including instances in which the audio signals are only output by a subset of the speakers as well as instances in which the audio signals are output by all of the speakers.

The processor 12 may be configured to preferentially direct the audio signals in various manners. In one embodiment, described below by way of example, but not of limitation, the processor may be configured to preferentially direct the audio signals to the one or more speakers 24 that are closest to the representation of the audio source as presented upon the display 22. The speakers that are more remote relative to the location of the representation of the audio source upon the display may either not receive the audio signals or be caused to output the audio signals with a lower volume.

By way of example, the processor 12 of one embodiment may be configured to preferentially direct the audio signals by causing the audio signals to be output with a greater volume by the one or more speakers 24 that are closest to the representation of the audio source on the display 22. In this regard, the processor may be configured to direct the audio signals to all of the speakers, but to cause the one or more speakers that are closest to the representation of the audio source on the display to output the audio signals with a greater volume than the one or more speakers that are further from the representation of the audio source on the display. In one embodiment, however, the processor may be configured to cause the audio signals to only be output by a subset of a plurality of speakers such that the one or more speakers that are further from the representation of the audio source on the display are not caused to output the audio signals.

With respect to the content presented upon the display 22 in the embodiment of FIG. 4, in response to the user selection of the representation of the audio source designated 40, which is between the upper and lower edges of the display and is closer to the left side than the right side of the display, the processor may be configured to cause the audio signals resulting from the selection of the audio source to be directed to the first speaker 24a, the sixth speaker 24f, the seventh speaker 24g and the eighth speaker 24h that are closest to the representation of the audio source and not to direct the audio signals to the other speakers, that is, the second speaker 24b, the third speaker 24c, the fourth speaker 24d and the fifth speaker 24e, that are further from the representation of the audio source. Thus, the audio output generated by selection of the audio source will be output generally from the left-hand side of the computing device 20 and not from the right-hand side of the computing device so as to provide the user with additional context regarding the relative location of the representation of the audio source within the content presented upon the display of the computing device. As another example, in response to the user selection of the representation of the audio source designated 42 in FIG. 4, which is located in the lower right corner of the display, the processor may be configured to cause the audio signals resulting from the selection of the audio source to be directed to the second speaker 24b, the third speaker 24c, the fourth speaker 24d and the fifth speaker 24e that are closest to the representation of the audio source and not to direct the audio signals to the other speakers, that is, the first speaker 24a, the sixth speaker 24f, the seventh speaker 24g and the eighth speaker 24h, that are further from the representation of the audio source. Thus, the audio output generated by selection of the audio source will be output generally from the right-hand side of the computing device 20 and not from the left-hand side of the computing device so as to provide the user with additional context regarding the relative location of the representation of the audio source within the content presented upon the display of the computing device.

By way of further example in which the representation of the audio source is provided by user-selectable tab associated with the content as shown in FIG. 5, the user selection of the left-most tab 44, e.g., Tab 1, may cause the processor 12 to preferentially direct the audio signals that are generated upon execution of the audio source to the first speaker 24a and the eighth speaker 24h that are most closely located relative to the position of the tab upon the display 22 and not to the other speakers that are further from the tab that has been selected by the user. Conversely, in an instance in which the user has selected the right-most tab, e.g., Tab 8, the audio signals generated by execution of the audio source may be preferentially directed by the processor to the second speaker 24b and the third speaker 24c that are located closest to the right-most tab and not to the other speakers that are further from the representation of the audio source. As such, the method, apparatus and computing device to this embodiment may provide context to the user with respect to the relative location of the tab that has been selected.

In an example embodiment, the apparatus 10, such as the processor 12, may be configured to cause audio signals generated not only by the audio source(s) having representation(s) within the content displayed in response to the selection of a respective tab, but also or alternatively to cause audio signals to be generated by the audio source(s) having representation(s) within the content associated with one or more of the tabs that have not been selected. In this embodiment, the processor may be configured to preferentially direct the audio signals from the audio source(s) having representation(s) within the content associated with one or more of the tabs that have not been selected to one or more speakers located most closely to the respective tab, such as the second speaker 24b and the third speaker 24 in regards to the right most tab of the FIG. 5. Additionally or alternatively, the processor may be configured to control the volume of the audio signals generated by the audio source(s) having representation(s) within the content associated with one or more of the tabs that have not been selected, such as by causing the audio signals to be played with a lower volume in relation to the audio signals generated by the audio source(s) having representation(s) in the content associated with the selected tab.

The processor 12 may alternatively or additionally be configured to cause the audio signals to be output by a plurality of speakers 24 and to also cause the audio signals output by the plurality of speakers to have different volumes based upon the location of the representation of the audio source relative to the display 22 and also based upon the respective positions of the plurality of speakers relative to the display. With respect to the example of FIG. 4 in which the audio source associated with the representation designated 40 is generating audio signals, the processor of this embodiment may be configured to cause the first speaker 24a and the eighth speaker 24h to output the audio signals with an equal, but greater volume, and may cause the sixth speaker 24f and the seventh speaker 24g to output the same audio signals with the seventh speaker generating the same audio signals with an intermediate volume and the sixth speaker generating the same audio signals with even a lesser volume since the first and eighth speakers are equidistant from the representation of the audio source upon the display, but are closer to the representation of the audio source upon the display than the sixth and seventh speakers, which are increasingly further from the representation of the audio source upon the display than the first and eighth speakers.

As another example, in an instance in which the processor 12 may be configured to direct the audio signals generated by the audio source associated with the representation designated 42 in FIG. 4 to the second speaker 24b, the third speaker 24c, the fourth speaker 24d and the fifth speaker 24e, the processor may be configured to cause the fourth and the fifth speakers to output the audio signals with an equal, but greater volume, and may cause the third speaker to output the same audio signals with an intermediate volume and the second speaker to output the same audio signals with a lesser volume. In this regard, the fourth and fifth speakers are equidistant from the representation of the audio source upon the display 22, but are closer to the representation of the audio source upon the display than the third and second speakers, which are also equidistant from the representation of the audio source upon the display, but are increasingly further from the representation of the audio source upon the display than the fourth and fifth speakers.

Still further, in an instance in which the representation of the audio source is provided by a user-selectable tab associated with the content and further in an instance as shown in FIG. 5 in which the left-most tab 44, e.g., Tab 1, has been selected and the audio signals are directed to the first speaker 24a, the second speaker 24b, the seventh speaker 24g and the eighth speaker 24h, the processor 12 may be further configured to cause the first and the eighth speakers to output the audio signals with an equal, but greater volume, and may cause the second and seventh speakers to output the same audio signals with an equal, but lesser, volume. In this regard, the first and eighth speakers are equidistant from the representation of the audio source upon the display 22, but are closer to the representation of the audio source upon the display than the second and seventh speakers, which are also equidistant from the representation of the audio source upon the display, but are further from the representation of the audio source upon the display than the first and eighth speakers.

As the foregoing examples demonstrate, the processor 12 may be configured to cause the audio signals to be directed to all of the speakers 24 with the preferential direction of the audio signals being provided by the control provided by the processor as to the different volumes with which the speakers are to output the audio signals. Alternatively, the processor may be configured to preferentially direct the audio signals to only the subset of the speakers with each of the speakers being caused to output the audio signals with the same volume or with different volumes that are also attributable to the location of the representation of the audio source relative to the display and the respective positions of the plurality of speakers relative to the display as described above. Although the above examples have defined the subset of speakers as a plurality of speakers, the subset of speakers to which the audio signals are preferentially directed may include a single speaker, with the single speaker being selected based upon the relative location of the representation of the audio source to the display and the respective positions of the speakers, including the single speaker that is selected, to the display. Additionally, the processor may optionally be configured to control the volume of the audio signals generated by the single speaker in this embodiment based upon the relative location of the representation of the audio source to the single speaker with an audio source that has a representation that is located more closely to the single speaker generating audio signals having a greater volume than an audio source that has a representation that is further removed from the single speaker.

As shown in FIG. 4, for example, the content may include representations of a plurality of audio sources. In order to avoid the confusion or sensory overload that may be created by the concurrent output of audio signals from each or a plurality of the audio sources, the apparatus 10 of one embodiment may include means, such as the processor 12 or the like, for causing audio signals from no more than a predetermined maximum number of audio sources to be concurrently output. The predetermined maximum number may be a setting of the computing device 20 that may be established in advance by the manufacturer, by a service provider, by the user or the like. However, the predetermined maximum number may be defined in other manners. The predetermined maximum number may be set to any value, such as 1, such that audio signals from only a single audio source may be output, or 2 or more in instances in which the audio sources from the predetermined maximum number of audio sources may be concurrently output in instances in which audio signals from more than the predetermined maximum number of audio sources would otherwise be output in the absence of the constraint imposed by the predetermined maximum number, such as in instances in which a user has concurrently selected more than the predetermined maximum number of audio sources to be launched or in instances in which more than the predetermined number of audio sources are automatically launched upon selection of the content for presentation upon the display 22.

The processor 12 may be configured to determine the audio signals from which of the audio sources are to be concurrently output in various manners including, for example, by causing the audio signals from the audio sources that were initially selected by the user to be output with precedence relative to later selected audio sources. In another embodiment, the processor may be configured to preferentially output audio signals from audio sources based upon the locations of the representations of the audio sources. Alternatively, the processor may be configured to preferentially output audio signals from the audio sources for which representations are more centrally located within the content to be output with precedence relative to more peripherally located representations of the audio sources. In yet another embodiment, the user may provide information regarding an order of precedence based upon the type of audio sources, such as by silencing the audio signals generated by an advertisement in an instance in which the content includes a related (non-advertising) video clip. As such, the audio signals from the video clip would be output in this embodiment, but not the audio signals from the advertisement.

In some embodiments, the content to be presented upon the display 22 is such that the content must be scrolled in order to cause different portions of the content to be presented upon the display. As such, the operations that may be performed, such as by the apparatus 10 of FIG. 1, are depicted in FIG. 6 in conjunction with content that is to be scrolled upon the display. In this embodiment, the apparatus may include means, such as the processor 12, the user interface 18 or the like, for causing content to be presented upon the display with the content being associated with a representation of an audio source, as described above and as shown in block 50. As also described above and as shown in blocks 52 and 54 of FIG. 6, the apparatus to this embodiment may include means, such as a processor or the like, for determining the location of the representation of the audio source relative to the display and means, such as the processor, the user interface or the like, for preferentially directing audio signals generated by the audio source to one or more of a plurality of speakers 24 that have different positions relative to the display. In this embodiment, the apparatus may also include means, such as the processor, the user interface or the like, for causing content to be scrolled upon the display such that the location of the representation of the audio source relative to the display changes. See block 56.

As shown in FIG. 7, for example, the content may include textual content and representations of first and second audio sources 70 and 72 positioned at different relative locations within the content. As also shown in FIG. 7, only a portion of the content may be presented upon the display 22 at any one time, such as represented by the rectangular frame. The portion of the content that is inside the rectangular frame is presented upon the display, while those portions of the content that are outside the rectangular frame, including the representations of the first and second audio sources, are not currently presented upon the display However, by scrolling the content upwardly or downwardly, different portions of the content may be presented upon the display. While upward and downward scrolling of the content is described herein by way of example, the apparatus 10, such as the processor 12, the user interface 18 or the like, may be configured to scroll the content in different directions, such as to the right or to the left, diagonally or the like in other embodiments. Although the representations of the audio sources of FIG. 7 are not presented upon the display, the audio sources may have been selected or otherwise actuated by a user prior to being scrolled off of the display or the audio sources may be such that the audio signals generated thereby are produced automatically and output upon selection of the content without any requirement for user selection or actuation.

In accordance with this embodiment and as shown in block 58 of FIG. 6, the apparatus 10 may also include means, such as the processor 12 or the like, for modifying the preferential direction of the audio signal as the location of the representation of the audio source relative to the display 22 changes in response to scrolling of the content. The processor may be configured to modify the preferential direction of the audio signals in various manners. In an instance in which the representation of the audio source is presented upon the display, the processor may be configured to modify the speakers 24 to which the audio signals are directed and/or the volume of the audio signals directed to the respective speakers in response to scrolling of the content and movement of the representation of the audio source relative to the display. In another embodiment in which the representation of the audio content is not currently presented upon the display, the processor may be configured to preferentially direct the audio signals by causing the audio signals to be output at a volume that depends upon the distance that the content must be scrolled to cause the representation of the audio source to be presented upon the display as well as the direction in which the representation of the audio source is being scrolled relative to the display. See block 60 of FIG. 6. For example, the processor may be configured to cause the audio signals to be output with a volume that is inversely proportional to the distance that the content must be scrolled to cause the representation of the audio source to be presented upon the display.

Relative to the example of FIG. 7, the audio signals generated by the audio source represented by the designation 70 may be output with a volume that is relatively faint as a result of the greater distance of the representation of the audio source from the display 22 and the greater distance that the content must be scrolled for the representation of the audio source to be presented upon the display. In instances in which the content is being scrolled such that the representation of the audio source 70 is moving in an upward direction further away from the display, the volume of the audio signals may be correspondingly reduced. The processor of one embodiment may include a minimum threshold such that in instances in which the representation of the audio source is at least a predefined distance from the display such as in instances in which the content must be scrolled by at least the predetermined distance in order to be presented upon the display, the audio signals will no longer be output by the speakers, thereby resulting in a disappearing audio source. As another example, in an instance in which the audio signals are generated by the audio source having a representation designated 72, the processor may cause the audio signals to be output at a greater volume than the audio signals associated with representation of the audio source designated 70 since the representation of the audio source designated 72 is closer to the display (and therefore requires less scrolling to reach the display) than the representation of the audio source designated 70. However, the audio signals generated by each of these audio sources will generally be at a lower volume than the audio signals generated by an audio source having a representation that is actually presented upon the display. As the content is scrolled upwardly as described above such that the representation of the audio source designated 72 approaches the display, the volume of the audio signal may correspondingly increase since the distance from the representation of the audio source to the display is reduced.

As described above, a method, apparatus 10 and computer program product are provided to further enhance the experience of a user of a computing device 20 having a plurality of speakers 24. In this regard, the method, apparatus and computer program product of an example embodiment may preferentially direct audio signal to one or more of the speakers based upon the location of the representation of the audio source within the content that is presented upon a display relative to the display itself and also based upon the location of the speakers relative to the display. As such, the method, apparatus and computer program product of an example embodiment may cause the audio signals to be output in a manner that provides additional context to the user and that further enhances the user experience.

As described above, FIGS. 3 and 6 illustrate flowcharts of an apparatus 10, method, and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of block 60 in FIG. 6. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:
   causing content to be presented upon a display, the content being associated with a first representation of a first audio source and a second representation of a second audio source;
   determining a location of each of the first representation of the first audio source and the second representation of the second audio source relative to the display;
   identifying one or more of a plurality of speakers, the plurality of speakers having different positions relative to the display, and the identifying based at least upon the location of each of the first representation of the first audio source and the second representation of the second audio source relative to the display, and the identifying further based at least upon the different positions of the plurality of speakers relative to the display;
   outputting the first audio signal generated by the first audio source and the second audio signal generated by the second audio source by at least directing, to the identified one or more of the plurality of speakers, the first audio signal generated by the first audio source and the second audio signal generated by the second audio source, the first audio signal being output at a first volume and the second audio signal being output at a second volume;
   in response to the first representation of the first audio source being scrolled off the display, continuing to output the first audio signal generated by the first audio source at a third volume that is inversely proportional to a first distance the content is scrolled in order for the first representation of the first audio source to be presented on the display, the third volume being further dependent on a first direction in which the first representation of the first audio source is scrolled in order for the first representation of the first audio source to be presented on the display; and
   in response to the second representation of the second audio source being scrolled off the display, continuing to output the second audio signal generated by the second audio source at a fourth volume that is inversely proportional to a second distance the content is scrolled in order for the second representation of the second audio source to be presented on the display, the fourth volume being further dependent on a second direction in which the second representation of the second audio source is scrolled in order for the second representation of the second audio source to be presented on the display,
   wherein the display and the plurality of speakers comprise and/or are comprised in an apparatus.

2. A method according to claim 1, wherein the directing of the first audio signal and the second audio signal comprises causing each of the first audio signal and the second audio signal to be output with greater volume by the identified one or more of the plurality of speakers that are closest to each of the first representation of the first audio source and the second representation of the second audio source on the display.

3. A method according to claim 2, wherein the causing of the first audio signal and the second audio signal to be output with greater volume comprises causing each of the first audio signal and the second audio signal to only be output by the identified one or more of the plurality of speakers, and wherein at least one speaker that is further from each of the first representation of the first audio source and second representation of the second audio source on the display is not caused to output the first audio signal.

4. A method according to claim 2, wherein causing the first audio signal and the second audio signal to be output with greater volume comprises causing each of the first audio signal and the second audio signal to be output by the identified one or more of the plurality of speakers, and causing each of the first audio signal and the second audio signal output by the identified one or more of the plurality of speakers to have different volumes based upon the location of each of the first representation of the first audio source and the second representation of the second audio source relative to the display and the different positions of the identified one or more of the plurality of speakers relative to the display.

5. A method according to claim 4, further comprising:
   causing the content to be scrolled upon the display, wherein the location of each of the first representation of the first audio source and the second representation of the second audio source relative to the display change in response to the scrolling of the content upon the display;
   responding to the change in the location of each of the first representation of the first audio source and the second representation of the second audio source relative to the display by identifying at least one speaker different from the identified one or more of the plurality of speakers; and
   directing each the first audio signal generated by the first audio source and the second audio signal generated by the second audio source to the at least one speaker.

6. A method according to claim 1, wherein the first audio source and the second audio source each comprise at least one of an advertisement, a media player, a music store application, and/or a media clip.

7. A method according to claim 1, wherein the first representation of the first audio source and/or the second representation of the second audio source comprise a user selectable tab associated with the content.

8. A method according to claim 1, wherein no more than a predetermined maximum quantity of audio sources including the first audio source and the second audio source are directed to be concurrently output by the identified one or more of the plurality of speakers.

9. An apparatus comprising at least one processor and at least one memory including computer program code, the at least one memory and the computer program code configured to, with the at least one processor, cause the apparatus to at least:
   cause content to be presented upon a display, the content being associated with a first representation of a first audio source and a second representation of a second audio source;
   determine a location of each of the first representation of the first audio source and the second representation of the second audio source relative to the display;
   identify one or more of a plurality of speakers, the plurality of speakers having different positions relative to the display, and the identifying based at least upon the location of each of the first representation of the first audio source and the second representation of the second audio source relative to the display, and the identifying further based at least upon the different positions of the plurality of speakers relative to the display;
   output the first audio signal generated by the first audio source and the second audio signal generated by the second audio source by at least directing, to the identified one or more of the plurality of speakers, the first audio signal generated by the first audio source and the second audio signal generated by the second audio source, the first audio signal being output at a first volume and the second audio signal being output at a second volume; and in response to the first representation of the first audio source being scrolled off the display, continue to output the first audio signal generated by the first audio source at adjusting a third volume that is inversely proportional to a first distance the content is scrolled in order for the first representation of the first audio source to be presented on the display, the third volume being further dependent on a first direction in which the first representation of the first audio source is scrolled in order for the first representation of the first audio source to be presented on the display; and in response to the second representation of the second audio source being scrolled off the display, continuing to output the second audio signal generated by the second audio source at a fourth volume that is inversely proportional to a second distance the content is scrolled in order for the second representation of the second audio source to be presented on the display, the fourth volume being further dependent on a second direction in which the second representation of the second audio source is scrolled in order for the second representation of the second audio source to be presented on the display, wherein the display and the plurality of speakers comprise and/or are comprised in the apparatus.

10. An apparatus according to claim 9, wherein the at least one memory and the computer program code are configured to, with the at least one processor, cause the apparatus to at least direct the first audio signal and the second audio signal by causing each of the first audio signal and the second audio signal to be output with greater volume by the identified one or more of the plurality of speakers that are closest to each of the first representation of the first audio source and the second representation of the second audio source on the display.

11. An apparatus according to claim 10, wherein the at least one memory and the computer program code are configured to, with the at least one processor, cause the apparatus to at least cause the first audio signal and the second audio signal to be output with greater volume by causing each of the first audio signal and the second audio signal to only be output by the identified one or more of the plurality of speakers, and wherein at least one speaker that is further from each of the first representation of the first audio source and the second representation of the second audio source on the display is not caused to output the first audio signal.

12. An apparatus according to claim 10, wherein the at least one memory and the computer program code are configured to, with the at least one processor, cause the apparatus to at least cause the first audio signal and the second audio signal to be output with greater volume by causing each of the first audio signal and the second audio signal to be output by the identified one or more of the plurality of speakers to have different volumes based upon the location of each of the first representation of the first audio source and the second representation of the second audio source relative to the display and the different positions of the identified one or more of the plurality of speakers relative to the display.

13. An apparatus according to claim 12, wherein the at least one memory and the computer program code are further configured to, with the at least one processor, cause the apparatus to at least:

cause the content to be scrolled upon the display, wherein the location of each of the first representation of the first audio source and the second representation of the second audio source relative to the display changes in response to the scrolling of the content upon the display;

respond to the change in the location of each of the first representation of the first audio source and the second representation of the second audio source relative to the display by identifying at least one speaker different from the identified one or more of the plurality of speakers; and direct each of the first audio signal generated by the first audio source and the second audio signal generated by the second audio source to the at least one speaker.

14. An apparatus according to claim 9, wherein the first audio source and the second audio source each comprise at least one of an advertisement, a media player, a music store application and/or a media clip.

15. An apparatus according to claim 9, wherein the first representation of the first audio source and/or the second representation of the audio source comprise a user selectable tab associated with the content.

16. A computer program product comprising a non-transitory computer readable medium having program code portions stored thereon, the program code portions configured, upon execution, to at least:

cause content to be presented upon a display, the content being associated with a first representation of a first audio source and a second representation of a second audio source;

determine a location of each of the first representation of the first audio source and the second representation of the second audio source relative to the display;

identify one or more of a plurality of speakers, the plurality of speakers having different positions relative to the display, and the identifying based at least upon the location of each of the first representation of the first audio source and the second representation of the second audio source relative to the display, and the identifying further based at least upon the different positions of the plurality of speakers relative to the display;

output the first audio signal generated by the first audio source and the second audio signal generated by the second audio source by at least directing, to the identified one or more of the plurality of speakers, the first audio signal generated by the first audio source and the second audio signal generated by the second audio source, the first audio signal being output at a first volume and the second audio signal being output at a second volume; and in response to the first representation of the first audio source being scrolled off the display, continue to output the first audio signal generated by the first audio source at a third volume that is inversely proportional to a first distance the content is scrolled in order for the first representation of the first audio source to be presented on the display, the third volume being further dependent on a first direction in which the first representation of the first audio source is scrolled in order for the first representation of the first audio source to be presented on the display; and in response to the second representation of the second audio source being scrolled off the display, continuing to output the second audio signal generated by the second audio source at a fourth volume that is inversely proportional to a second distance the content is scrolled in order for the second representation of the second audio source to be presented on the display, the fourth volume being further dependent on a second direction in which the second representation of the second audio source is scrolled in order for the second representation of the second audio source to be presented on the display, wherein the display and the plurality of speakers comprise and/or are comprised in an apparatus.

\* \* \* \* \*